United States Patent

Tarancon

[11] Patent Number: 5,260,033
[45] Date of Patent: Nov. 9, 1993

[54] TUBULAR MECHANICAL REACTOR

[75] Inventor: Gregorio Tarancon, Woodbridge, N.J.

[73] Assignee: Liquid Carbonic, Inc., Ontario, Canada

[21] Appl. No.: 775,765

[22] Filed: Oct. 15, 1991

Related U.S. Application Data

[63] Continuation-in-part of Ser. No. 545,277, Jun. 28, 1990, Pat. No. 5,149,944.

[51] Int. Cl.$^5$ .................................................. B01F 7/00
[52] U.S. Cl. ................................ 422/137; 422/135; 422/189; 422/229; 366/324
[58] Field of Search ............... 422/135, 137, 189, 229; 366/324

[56] References Cited

U.S. PATENT DOCUMENTS

| | | | |
|---|---|---|---|
| 2,811,468 | 10/1957 | Joffre | 215/1 C |
| 3,019,895 | 2/1962 | Loevenstein et al. | 366/324 |
| 3,253,892 | 5/1966 | Brignac | 366/324 |
| 3,836,336 | 9/1974 | Yasui et al. | 422/189 |
| 4,288,410 | 9/1981 | Weber et al. | 422/189 |
| 4,536,266 | 8/1985 | Bliefert et al. | 204/159.18 |
| 5,044,759 | 9/1991 | Gagliani | 366/324 |
| 5,056,925 | 10/1991 | Klein | 366/324 |

OTHER PUBLICATIONS

Pierce et al. *Chemical & Engineering News*, "New and Varied Paths for Fluorine Chemistry", Jul. 9, 1962, pp. 72-80.

Clark et al., *The Journal of Polymer Science*, "Applications of ESCA To Polymer Chemistry Part VI. Surface Fluorination of Polyethylene, Application of ESCA to the Examination of Structure as a Function of Depth", 1975, pp. 857-889.

*Primary Examiner*—Robert J. Warden
*Assistant Examiner*—T. A. Trembley
*Attorney, Agent, or Firm*—Neil F. Markva

[57] ABSTRACT

An apparatus for the direct fluorination of solid particles of polymeric resins capable of being fluorinated in which the solid particles are in contact with the gaseous phase of fluorine/dense carrier fluid in a tubular reactor with an internal mechanical device comprising a rotatable shaft with screw flight, multiblade or wire brush that mechanically fluidizes the solid phase. The design of the internal mechanical device is a function of the diameter and length of the tubular reactor and the reaction time and other physical properties of the solid particles of polymeric resins. The internal mechanical device prevents agglomeration of the solid particles and promotes uniform contact with the gaseous phase by inducing mobility to the solid particles. The enhancement of solid surface contact with the gaseous phase assists the reaction between the solid polymeric resin and the elemental fluorine, as well as the heat dissipation into the dense carrier fluid.

8 Claims, 5 Drawing Sheets

TUBULAR MECHANICAL REACTOR

BACKGROUND OF THE INVENTION

This application is a continuation-in-part of application Ser. No. 07/545,277 filed Jun. 28, 1990 and issued Sep. 22, 1992 as U.S. Pat. No. 5,149,944.

This invention relates to the direct fluorination of polymeric resins and, more particularly, relates to a tubular mechanical reactor apparatus for the direct fluorination of polymeric resins in particulate form which are capable of being fluorinated by contact with elemental fluorine and a carrier fluid.

FIELD OF THE INVENTION

The fluorination of polymers to enhance lubricity, nonflammability and chemical inertness, such as resistance to oxidation, and to reduce permeability by organic solvents, particularly non polar solvents, by the replacement of hydrogen by fluorine by the use of fluorine itself or by the use of a metal fluoride is well known.

The July, 1962 publication of Chemical & Engineering News discusses in the article "New and Varied Paths for Fluorine Chemistry" the chemical reactions which occur when fluorine reacts with organic molecules. The Encyclopedia of Chemical Technology, Third Edition, (Volume 10) published by John Wiley & Sons discusses direct fluorination of organic compounds to produce fluorocarbon polymers by the direct reaction of fluorine with polyethylene.

The Polymer Letters Edition, Volume 12, (1974), contains the article "The Controlled Reaction of Hydrocarbon Polymers with Elemental Fluorine" which discloses the reaction of polyethylene and other finely powdered hydrocarbon polymers with fluorine.

The Journal of Polymer Science, Volume 13, pp 857-890, (1975), discloses in "Part VI Surface Fluorination of Polyethylene" the surface coating of polyethylene by replacement of hydrogen by fluorine.

U.S. Pat. No. 2,811,468 issued Oct. 29, 1957 discloses the fluorination of a surface of polyethylene film to render the surface substantially impermeable.

Fluorination of polymeric resins is usually carried out with carriers in the gas phase or in the liquid phase. In the liquid fluorination phase the temperature of operation is generally lower than room temperature and the fluorine concentration is lower than 2 mole per cent. In the gas phase fluorination, the temperature of operation is above the room temperature and the fluorine concentration generally is higher than 2 mole per cent.

Gaseous carrier fluids essentially are ideal gases with low heat capacity per unit of volume, low polarizability or ability to induce dipole moment, and low critical temperature as well as a cryogenic boiling point. When fluorine reacts with solid particles of polymeric resin, such as polyolefin resins including polyethylene, hydrogen in the polymer molecule combines with fluorine atoms to form hydrogen fluoride. The reaction is exothermic and, in order to prevent deterioration of the resin during fluorination due to local overheating, generated heat must be dissipated.

The carrier fluids used in the prior art (e.g., $N_2$, Ar, He) are gases that have a low-solubility capacity for the byproduct hydrogen fluoride which is produced because of their polarizability, low critical temperature, low density, and low heat capacity, which reduces their ability for heat transfer in both directions.

U.S. Pat. No. 4,536,266 issued Aug. 20, 1985 teaches a process for the fluorination of surface layers of articles by exposure of the surface layer to a fluorine-yielding liquid solvent or solvent mixture in a controllable reaction by controlled introduction of fluorine gas in order to overcome problems considered inherent with the use of gaseous carrier fluids.

It is a principal object of the present invention to provide an apparatus for the fluorination of polymeric resins quickly, consistently and safely by the use of elemental fluorine in a vapour phase with a carrier fluid which effectively functions as a heat sink to maintain a constant reaction temperature to control the aggressiveness of the elemental fluorine during the reaction with polymeric resin particles and to provide uniform treatment of the resins by maintaining continuous contact between the particles and the fluorine.

It is another object of the invention to provide an apparatus for batch or continuous fluorination of polymeric resins in which operating parameters can be closely controlled to prevent agglomeration of the particles by continuously mechanically fluidizing or agitating the resin particles to maintain the particles in a state of fluidity.

SUMMARY OF THE INVENTION

In its broad aspect, the apparatus of the present invention for fluorinating particulate polymeric materials comprises a tubular reactor having a mechanical fluidizer mounted for rotation within a housing, said fluidizer having a plurality of openings for allowing a fluid to pass therethrough, said housing having a feed end and a discharge end, means for rotating said fluidizer, means for feeding said polymeric material in particulate form to the housing at the feed end thereof for passage through the reactor, means for discharging said polymeric material from the discharge end thereof, means for feeding a mixture of fluorine and carrier fluid to said reactor at one end of the housing for passage through the openings in the fluidizer to react with the fluidized polymeric material, and means in communication with the housing, such as an evacuating pump, for passing the fluorine and carrier fluid mixture through the reactor.

In a preferred embodiment, the apparatus of the invention comprises a tubular screw reactor having a rotatable screw with a continuous helichoid flight or sectional flights within a cylindrical housing, said housing having a feed end and a discharge end, means for rotating said screw, said screw flight or flights having a plurality of perforations for allowing a fluid to pass therethrough, means for feeding said polymeric material in particulate form to the housing at the feed end thereof, means for receiving said polymeric material from the discharge end thereof, means for feeding a mixture of fluorine and carrier fluid to said reactor at one end of the housing for passing through the perforations in the screw flight or flights for reaction with the fluidized polymeric material, and means in communication with the housing for drawing the fluorine and dense carrier fluid mixture through the screw reactor.

The mechanical fluidizer may comprise a screw flight or flights, a ribbon conveyor, radial blades of uniform or variable length, or a cylindrical wire brush journalled for rotation within a housing. The mechanical fluidizer is rotated at a speed sufficient to agitate or fluidize the particulate polymeric material. It will be understood that the term "fluidize" used herein in the specification and claims includes agitation of the solid particles.

The carrier fluid is selected from the group consisting of helium, nitrogen, argon and a dense carrier fluid having a critical temperature higher than ambient temperature minus 60 celcius degrees, and a molecular weight greater than the molecular weight of elemental fluorine.

The dense carrier fluids of the present invention are neither gases nor liquids but function, under the conditions of the process of the invention, as vapours, which are dense compared to ideal gases but sufficiently remote from the dew point not to be classified as liquids.

Dense carrier fluids of the invention are vapours with molecular weights greater than the molecular weight of fluorine, critical temperatures higher than ambient temperature, i.e. room temperature, and a boiling point lower than room temperature minus 60 celcius degrees. Ambient or room temperature is defined to be about 24° C. In that the dense carrier fluid of the invention has a critical temperature higher than room temperature and a boiling point lower than room temperature minus 60 celcius degrees, a vaporous condition outside of the dew point is established in the temperature range of the process of a maximum of 60 celcius degrees above room temperature and a minimum of 60 celcius degrees below room temperature, i.e. about −36° C. to about 84° C. (237° K. to about 357° K.).

The dense carrier fluid has a molecular weight in the range of from about 40 to 200, preferably about 44 to 188, which is greater than the molecular weight of fluorine, to provide a carrier fluid having a density greater than the density of fluorine.

It is important in the selection of the dense carrier fluid to consider the degree of reactivity of the dense carrier fluid with fluorine as a function of the fluorine partial pressure and the operating temperature range during the time the dense carrier fluid is in contact with the fluorine gas. The selection of dense carrier fluid thus is based on its reactiveness with fluorine at the operating temperature and fluorine concentration while being compatible with the fluorine.

The dense carrier fluids have advantages compared with liquids and ideal gases. Liquids are difficult to totally remove from the reactor and represent hazardous environmental problem. The dense fluids approach the heat capacity of the liquids but can be extracted from the reactor in the same way as ideal gases which have a low heat capacity that permits easy elevation of the temperature in the reactor.

Liquid fluids have the critical temperature higher than the room temperature and the boiling point higher than the room temperature minus 60 celcius degrees. Gas fluids (ideal gases) have the critical temperature lower than the room temperature minus 60 celcius degrees and the boiling point lower than the room temperature minus 60 celcius degrees, as shown in Table 1.

TABLE 1

| TYPE OF FLUID | CRITICAL TEMPERATURE | BOILING POINT |
|---|---|---|
| Liquid fluids | >RT | >RT - 60°C. |
| Dense fluids | >RT | <RT - 60°C. |
| Ideal gases | <RT | <RT - 60°C. |

Turning now to Table 2, the vapor phase carrier fluid is shown to provide the optimum combination with respect to reactivity, heat capacity, density and handling compared to gas phase and liquid phase carrier fluids. Vapor carrier fluids having a molecular weight of 40 to 200 have a range of density of 1.8 to 9 g/l and a range of heat capacity of 9 cal/mole ° C. to 45 cal/mole ° C.

TABLE 2

| Carrier Fluid | | | | | |
|---|---|---|---|---|---|
| Physical state | Fluid | Boiling point | Density | Heat capacity | Fluorine reactivity |
| gas phase | N2 | −195° C. | 1.25 g/l | 7 cal/mole °C. | N |
| Vapour | SF6 | −50° C. | 6.50 g/l | 24 cal/mole °C. | N |
| Liquid | CBr2F2 | +25° C. | 2.45 Kg/l | 32 cal/mole °C. | Y |

Dense carrier fluids which meet the above criteria and are suited for the process of the invention are typified by perfluoropropane, chloropentafluoroethane, sulphurtetrafluoride, sulphur hexafluoride, tetrafluoroethylene, hexafluorothane, carbon dioxide, chlorotrifluoromethane, bromotrifluoromethane, and trifluoromethane.

Carbon dioxide ($CO_2$), for example, is a vapor at 300° K., is triatomic with different kinds of elements, and is a polarizable molecule, as opposed to the carrier fluids used in the prior art, which are diatomic or monotomic and have only one element. The density of $CO_2$ within the temperature range of the fluorination process of polyethylene (300° K. to 400° K.) is very high in comparison to the density of $N_2$ in the same range. The heat contained in $CO_2$ per unit of volume is double the amount contained in $N_2$ per unit of volume. HF is far more soluble in $CO_2$ than in $N_2$, guaranteeing a more complete fluorination reaction.

Because the critical temperature of $CO_2$ is 31° C., it can be stored at room temperature in regular tank containers. The carrier fluids in the prior art required cryogenic tanks with very sensitive temperature release valves to protect the container from excessive pressure.

The partial pressure of fluorine during the process of the invention is in the range of about 12 to about 120 torr and the total pressure is in the range of about 12 to 12,000 torr, preferably about 25 to about 2,500 torr. The fluorine concentration in the carrier fluid is in the range of about 2 to about 15% by volume, preferably about 3 to about 12% by volume.

BRIEF DESCRIPTION OF THE DRAWINGS

The apparatus of the invention will now be described with reference to the accompanying drawings, in which.

DESCRIPTION OF THE PREFERRED EMBODIMENT

Figure 1:
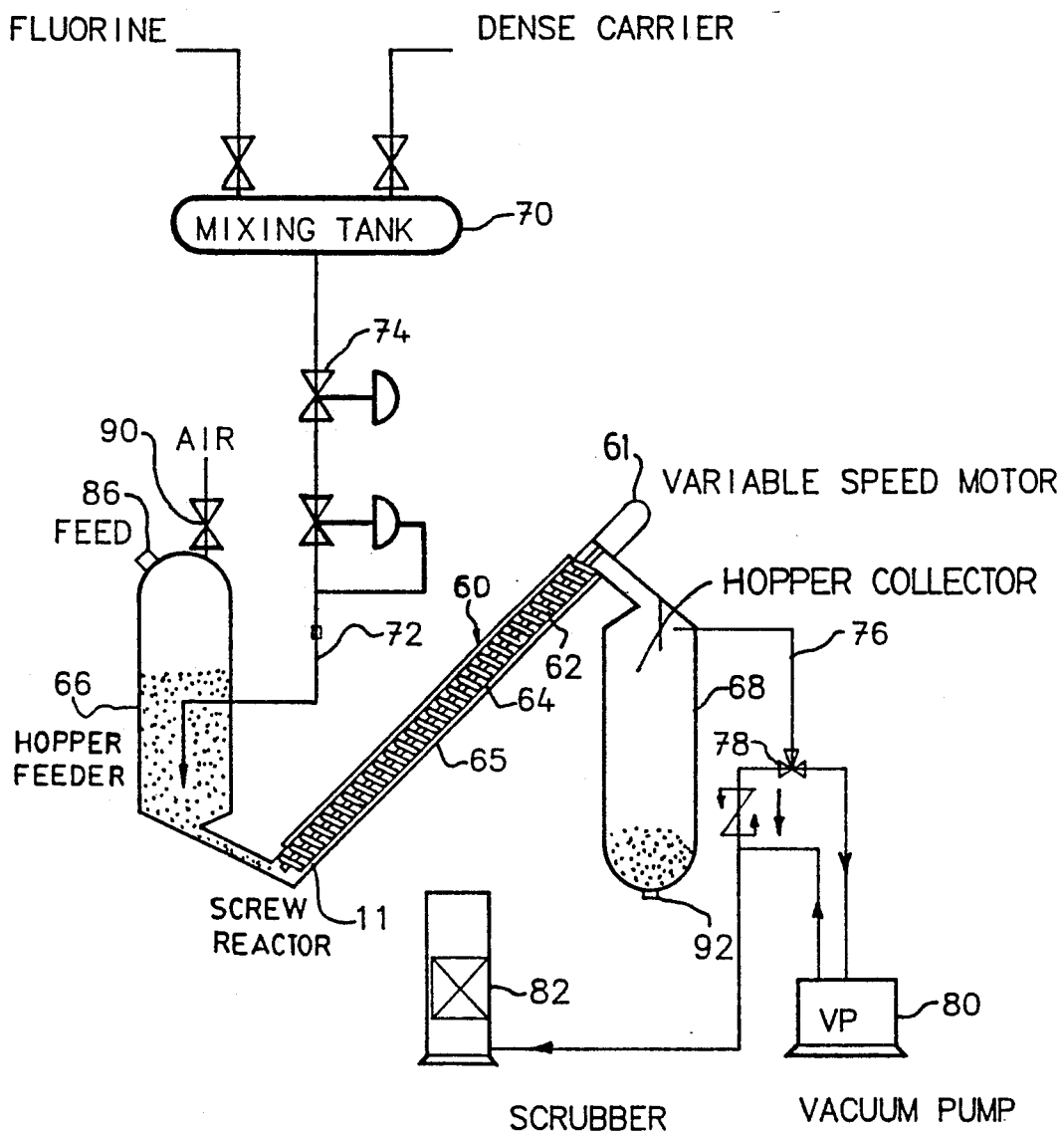
FIG. 1 is a schematic illustration of a batch screw reactor of the present invention.

With reference now to FIG. 1, tubular screw reactor 60 shown inclined at an angle of about 45° to the horizontal has a screw 62 in the form of a helichoid continuous flight or sectional flights within tubular housing 64. Screw 62 has a plurality of perforations of 50 to 250 microns diameter to permit the flow of gases and vapours through the flight(s) and along the tubular reactor. The pitch of the screw normally is equal to the diameter of the flight and the screw conveyor operates at a rate of revolution (rpm) of from 1 to 100 rpm sufficient to fluidize or at least agitate the particles as they are conveyed through the reactor.

The reactor 60 and its components may be fabricated from iron, steel, stainless steel, aluminum, copper, brass and the like. Gaskets may be formed from fluorinated rubber or plastic.

The heat of reaction may affect the temperature in the reactor with temperature elevation normally causing an increase in the pressure in the closed vessels. The provision of an external heat transfer jacket, containing a heat transfer medium such as water or oil, maintains the temperature relatively constant independent of the rate of reaction.

Solid particulate polymeric material is transferred from feed hopper 66 to the bottom of reactor 60 and particulate material is discharged from the top of reactor 60 into collector hopper 68. A mixing tank 70, having a supply of fluorine and carrier fluid, is in communication with the bottom of feed hopper 66 through line 72 having control valve 74. An exhaust line 76 from collector hopper 68 permits the exhaust of air and other gases from hopper 68 through two-way discharge valve 78 to evacuating pump 80 and through scrubber 82 to the atmosphere.

In operation, solid polymeric resins, preferably in the form of a particulate such as powder, pellets or granules, are charged to the feed hopper 66 through feed inlet 86 at the top of the hopper and the particulate feed is conveyed by screw reactor 60 driven by variable speed motor 61 to the top of collector hopper 68 by screw 62, the desired dwell time of the polymeric material within the reactor 60 and the degree of fluidizing being determined by the speed (i.e. rate of rotation) of variable speed screw 62.

Simultaneous with the operation of screw reactor 60, valve 74 is opened to allow the ingress of fluorine and the carrier gas mixture co-current with the direction of flow of solid particulate rising within the reactor 60 for intimate contact with the particulate material as the fluids passed through apertures formed in the screw flight(s). The carrier fluid with by-product gases pass through scrubber 82 for removal of toxic fluids before discharge to the atmosphere.

The fluorination reaction is completed upon transfer of solid particulate to the collector hopper 68, valve 74 is closed, and evacuation pump 80 removes all toxic fluids within the system for treatment in scrubber 82. Inlet 90 is then opened to permit the ingress of air into feed hopper 66, screw reactor 60 and collector hopper 68, and the fluorinated polymer is unloaded from collector hopper 68 through discharge port 92.

Although the mixture of fluorine and carrier gas is described with reference to co-current flow with the solid particulate, the gas flow may be counter-current to the particulate flow.

Figure 2:
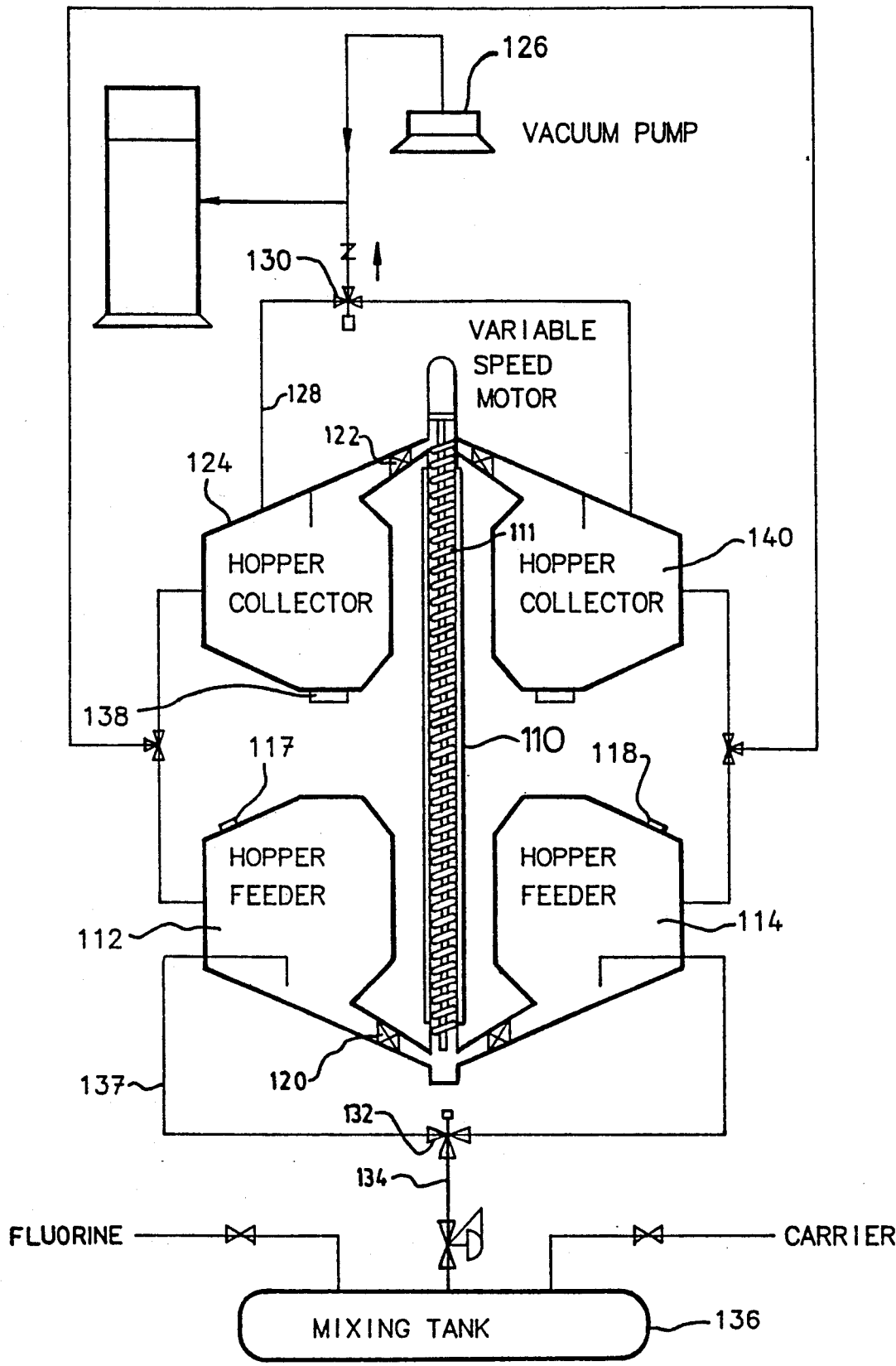
FIG. 2 is a schematic illustration of said screw reactor arranged in a continuous mode.

FIG. 2 illustrates another embodiment of screw reactor system of the invention in which screw reactor 110 is vertically inclined and interconnects at least a pair of feed hoppers 112, 114 and collector hoppers 124, 140 to permit a continuous mode of operation. Solid polymeric particles are charged to feed hoppers 112, 114 through inlet port 117, 118, respectively. Valve 120 at the base of screw reactor 110 in communication with feed hopper 112 and valve 122 at the top of said reactor in communication with collector hopper 124 are opened and air is removed from the pair of hoppers through evacuation pump 126 in communication with upper hopper 124 by line 128 and valve 130. Upon completion of air removal, valve 130 is closed and the rotation of screw 111 commenced. Valve 132 in flow line 134 from mixing tank 136 allows the flow of fluorine and dense carrier fluid from mixing tank 136 into feed hopper 112 through line 137 for co-current flow of the fluorine and the dense carrier with the flow of the particulate solids.

The reaction of fluorine with the polymeric resin takes place during the transfer of the solid particulate from hopper 112 to hopper 124 within screw reactor 110.

The pair of hoppers 114 and 140 are ready to continue the process reaction through screw reactor 110 upon emptying of solid particulate from feed hopper 112, the operation being carried on in the same manner as described for hoppers 112, 124. Fluorinated polymeric particles are removed from collector hopper 124 through outlet port 138 and feed hopper 112 is charged during the operation with hoppers 114, 140.

Figure 3:
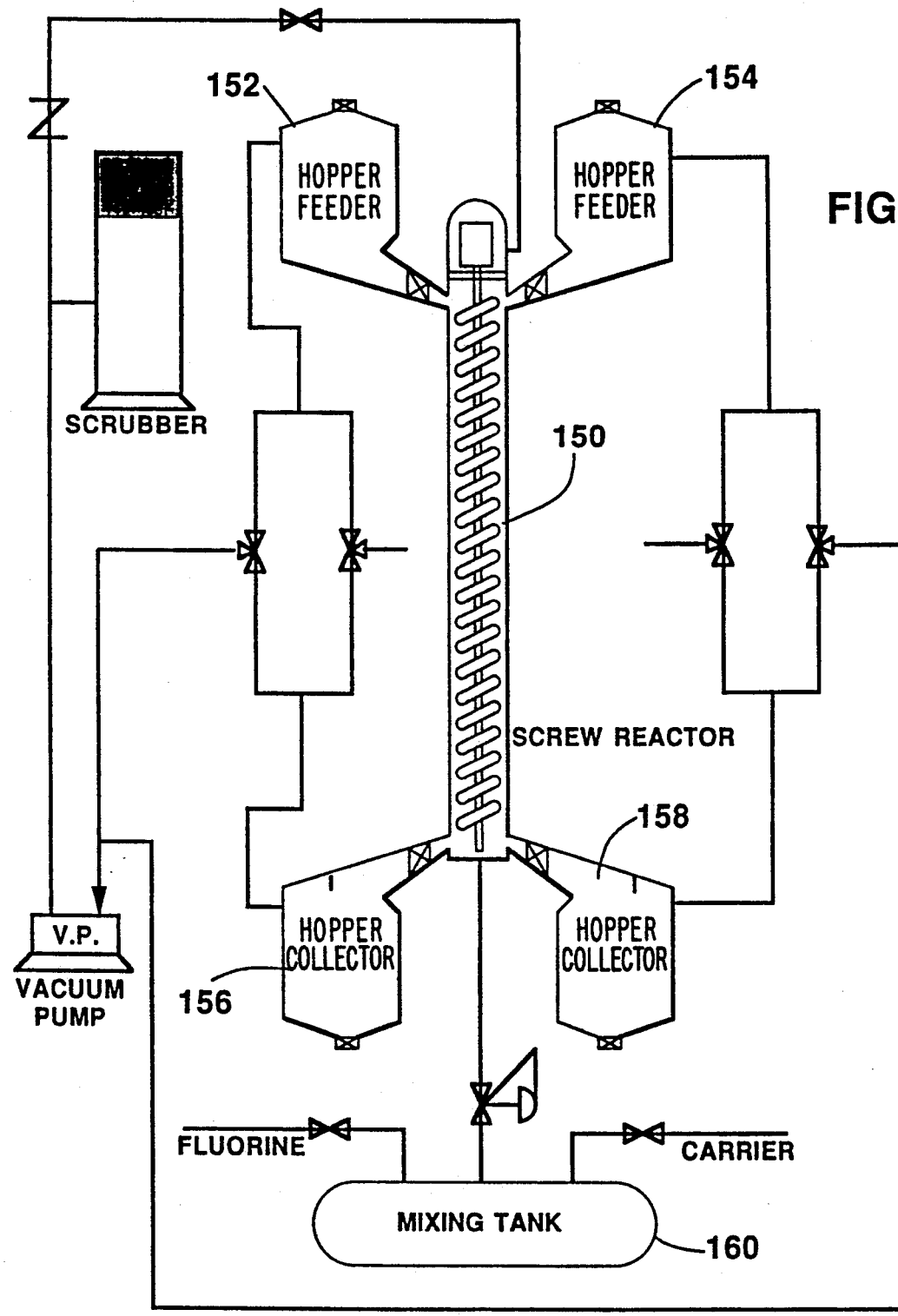
FIG. 3 is a schematic illustration of another embodiment of screw reactor arranged in a continuous mode.

FIG. 3 schematically illustrates another embodiment of screw reactor arranged in a continuous mode in which the vertical screw reactor 150 has the feed hoppers 152, 154 disposed at a height above the top of the reactor 150 and the collector hoppers 156, 158 disposed at a height below the base of reactor 150. The mixture of fluorine and carrier gas is introduced to the base of reactor 150 from mixing tank 160 to flow upwardly counter-current to the descending flow of particulate polymer. The operation of this embodiment of screw reactor is otherwise the same as the embodiment described with reference to FIG. 2.

The tubular screw reactors can be arranged vertically, horizontally or any angle between 0° to 90° with the horizontal. The reactors can be 1 inch to 150 inches in diameter with a length of 1 foot to 150 feet, the preferred diameter being 6–36 inches and the preferred length being 5–20 feet. The feed and discharge hoppers can have a capacity of 1 to 5,000 cubic feet, preferably 5–500 cubic feet.

Figure 4:
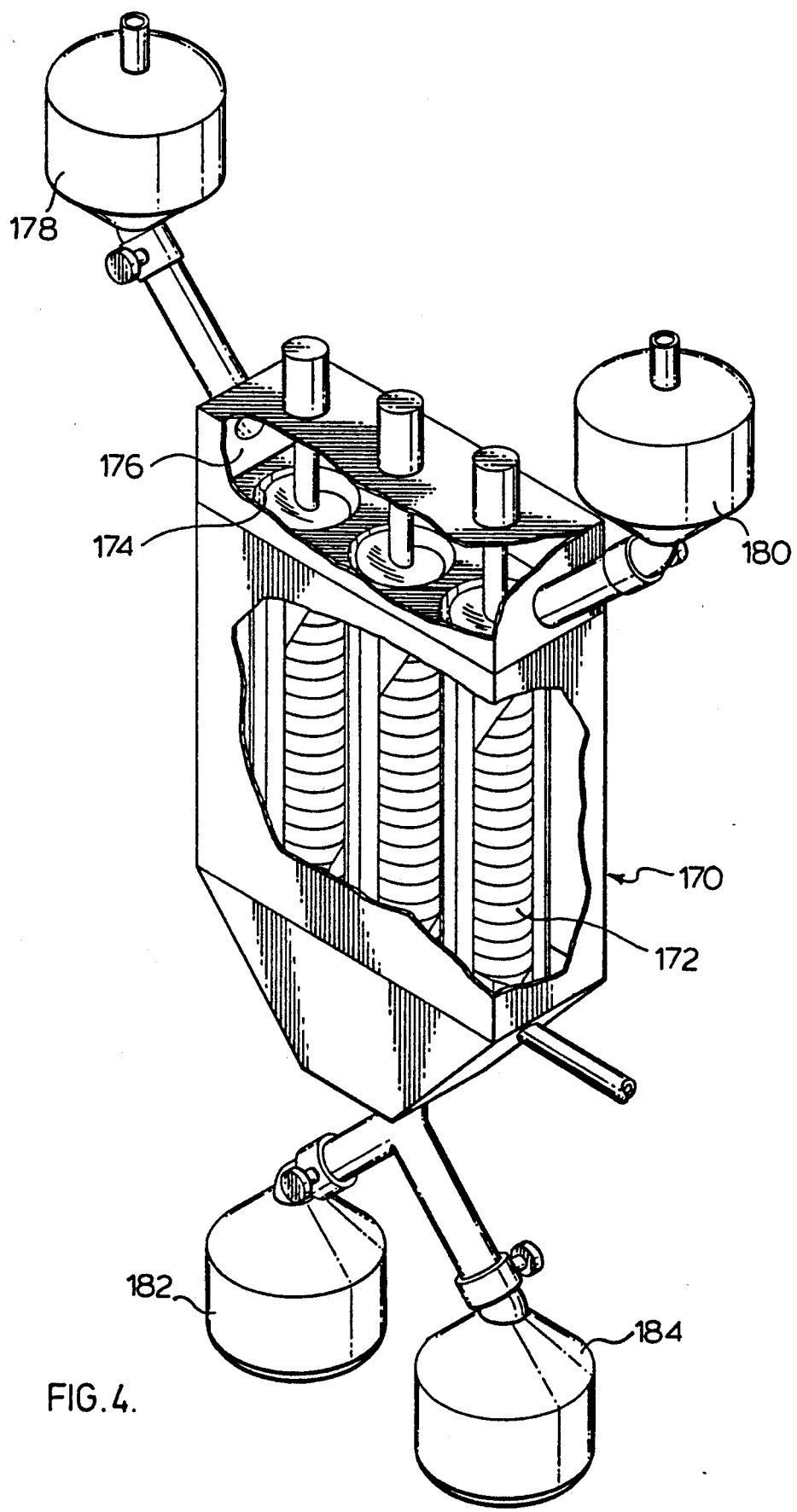
FIG. 4 is a perspective view, partly cut away, of a further embodiment of tubular reactor.

FIG. 4 illustrates an embodiment of vertical screw reactor 170 in which three mechanical fluidizers 172 are arranged vertically within respective cylindrical reactor zones 174.

Upper feed zone 176 receives particulate polymer from one of two feed hoppers 178, 180 for a continuous supply to the three fluidizers.

One of collector hoppers 182, 184 receives fluoridated polymeric material in the manner described with reference to the embodiments shown in FIGS. 2 and 3. A mixture of fluorine and carrier fluid is supplied at inlet 186 at the base of reactor 170 for a counter-current flow relative to the descending flow of particulate solid material.

Fluidizer 172 can be helical screws, as illustrated, or ribbon conveyors, radial blades, wire brushes or the like rotating at a speed sufficient to continuously agitate or fluidize the particulate solid material descending in an annulus formed about the periphery of the fluidizer.

Figure 5:
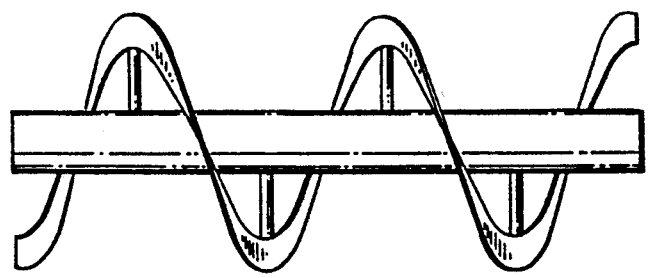
FIG. 5 is a side elevation of a single flight standard pitch ribbon conveyor.
Figure 6:
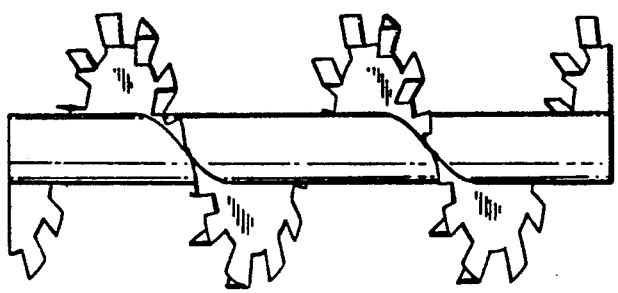
FIG. 6 is a side elevation of another embodiment of a of a single flight standard pitch ribbon conveyor.

FIGS. 5 and 6 show two embodiments of single flight standard pitch ribbon conveyors which can be substituted for helical screws.

Figure 7:
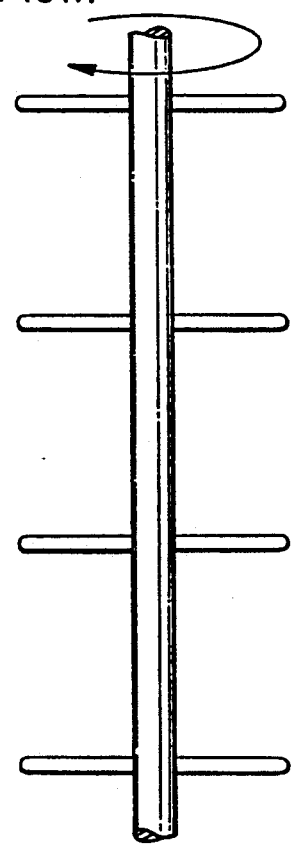
FIG. 7 is a side elevation of a uniform blade mixer.
Figure 8:
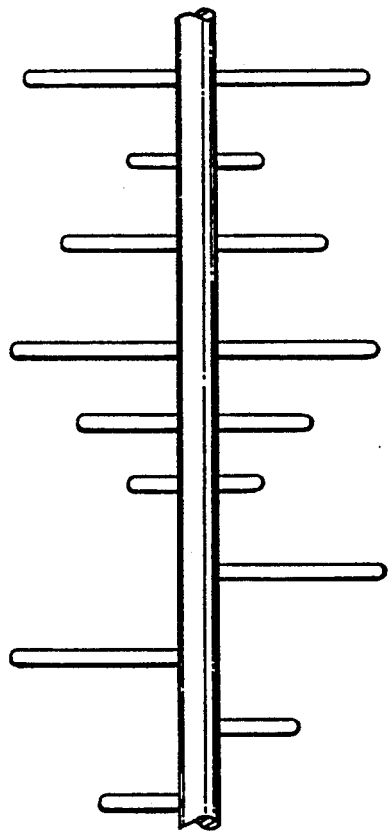
FIG. 8 is a side elevation of a variable length blade mixer.

FIGS. 7 and 8 show uniform length and variable length blade mixers which can be substituted for helical screws.

It will be understood of course that other embodiments of the invention will be clearly apparent to a person skilled in the art, the scope and purview of the invention being defined in the appended claims.

I claim:

1. An apparatus for fluorinating particulate polymeric materials capable of being fluorinated comprising: a vapour-tight tubular reactor having a rotatable mechanical fluidizer mounted for rotation within a housing, said rotatable mechanical fluidizer having a plurality of openings for allowing a vapour fluid to pass therethrough, said housing having a feed end and a discharge end, means for rotating said rotatable mechanical fluidizer, means for feeding a polymeric material in particulate form to the housing at the feed end thereof for passage through the vapour tight tubular reactor, a closed mixing tank, a source of fluorine and a source of carrier vapour fluid, said closed mixing tank containing a mixture of fluorine and carrier vapour fluid preparatory to feeding a mixture of fluorine and carrier vapour fluid to the vapour tight tubular reactor vessel, said carrier vapour fluid selected from the group consisting of helium, nitrogen, argon, and a dense carrier fluid having a critical temperature higher than ambient temperature, a boiling point lower than ambient temperature minus 60 celcius degrees, and a molecular weight greater than the molecular weight of elemental fluorine, means for feeding said mixture of fluorine and carrier vapour fluid to said tubular vapour-tight reactor at one end of the housing for passage through the plurality of openings in the rotatable mechanical fluidizer to react with the fluidized polymeric material, evacuating pump means in communication with the housing for drawing the fluorine and carrier vapour fluid mixture through the tubular vapour-tight reactor, and means for discharging fluorinated material from the discharge end of the housing.

2. An apparatus as claimed in claim 1 in which the rotatable mechanical fluidizer is a rotatable screw having a continuous helichoid flight or a plurality of sectional flights, a continuous or sectional ribbon flight, or plurality of uniform or variable length radial blades.

3. An apparatus as claimed in claim 2 in which means are provided to pass the fluorine and carrier vapour fluid through the vapour-tight tubular reactor counter-current to the flow of particulate polymeric material.

4. An apparatus as claimed in claim 2 in which means are provided to pass the fluorine and carrier vapour fluid through the vapour-tight tubular reactor co-current to the flow of particulate polymeric material.

5. An apparatus as claimed in claim 2 in which the vapour-tight tubular reactor is oriented at an angle between 0° and 90° with the horizontal.

6. An apparatus as claimed in claim 1 in which the feed end of the housing is higher than the discharge end of the housing, the rotatable mechanical fluidizer is a screw conveyor, and the means for feeding the mixture of fluorine and carrier vapour fluid is located at the discharge end whereby the passage of fluid mixture is counter-current to the passage of particulate polymeric material.

7. An apparatus as claimed in claim 1 in which the feed end of the housing is lower than the discharge end of the housing, the rotatable mechanical fluidizer is a screw conveyor, and the means for feeding the mixture of fluorine and carrier vapour fluid is located at the feed end whereby the passage of fluid is co-current to the passage of particulate polymeric material.

8. An apparatus for fluorinating particulate polymeric materials capable of being fluorinated comprising a rotatable screw with a continuous helichoid flight or sectional flights located within a vapour-tight cylindrical housing, said vapour-tight cylindrical housing having a feed end and a discharge end, means for rotating said rotatable screw, said continuous helichoid flight or sectional flights having a plurality of perforations for allowing a vapour to pass therethrough, means for feeding polymeric material in particulate form to the vapour-tight cylindrical housing at the feed end thereof, a closed mixing tank, a source of fluorine and a source of carrier vapour fluid, said closed mixing tank containing a mixture of fluorine and carrier vapour fluid preparatory to feeding a mixture of fluorine and carrier vapour fluid to the vapour-tight cylindrical housing, said carrier vapour fluid selected from the group consisting of helium, nitrogen, argon, and a dense carrier fluid having a critical temperature higher than ambient temperature, a boiling point lower than ambient temperature minus 60 celcius degrees, and a molecular weight greater than the molecular weight of elemental fluorine, means for feeding said mixture of fluorine and carrier vapour fluid to said vapour-tight cylindrical housing at one end of the vapour-tight cylindrical housing for passing through the plurality of perforations in the screw continuous helichoid flight or sectional flights for reaction with the polymeric material, evacuating pump means in communication with the vapour-tight cylindrical housing for drawing the fluorine and carrier vapour fluid mixture through the vapour-tight cylindrical housing, and means for discharging fluorinated material from the discharge end of the vapour-tight cylindrical housing.

* * * * *